US011687567B2

(12) United States Patent
Daniel et al.

(10) Patent No.: US 11,687,567 B2
(45) Date of Patent: *Jun. 27, 2023

(54) TRIGGER BASED ANALYTICS DATABASE SYNCHRONIZATION

(71) Applicant: VMWARE, INC., Palo Alto, CA (US)

(72) Inventors: Zundra Vennaldo Daniel, Atlanta, GA (US); Joshua Glenn Broch, Palo Alto, CA (US); Liny Chandran, Bangalore (IN); Abhishek Mishra, Atlanta, GA (US); Manu Nazareth, Atlanta, GA (US); Sangeeta Soman, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 271 days.

This patent is subject to a terminal disclaimer.

(21) Appl. No.: 15/865,288

(22) Filed: Jan. 9, 2018

(65) Prior Publication Data

US 2019/0087478 A1    Mar. 21, 2019

(30) Foreign Application Priority Data

Sep. 21, 2017  (IN) .............................. 201741033570

(51) Int. Cl.
*G06F 16/28*  (2019.01)
*G06F 9/54*  (2006.01)
(Continued)

(52) U.S. Cl.
CPC ............ *G06F 16/284* (2019.01); *G06F 9/546* (2013.01); *G06F 16/2365* (2019.01); *G06F 16/2433* (2019.01); *G06F 16/273* (2019.01)

(58) Field of Classification Search
CPC ...... G06F 9/546; G06F 16/283; G06F 16/284; G06F 16/273; G06F 16/2365;
(Continued)

(56) References Cited

U.S. PATENT DOCUMENTS 6,434,544 B1 *  8/2002  Bakalash .......... G06F 16/24556
7,509,671 B1 *  3/2009  Bedell ................... G06F 9/5038
726/6

(Continued)

OTHER PUBLICATIONS

Conn, Samuel S. "OLTP and OLAP data integration: a review of feasible implementation methods and architectures for real time data analysis." In Proceedings. IEEE SoutheastCon, 2005., pp. 515-520. IEEE, 2005. (Year: 2005).*

(Continued)

*Primary Examiner* — Jesse P Frumkin
(74) *Attorney, Agent, or Firm* — Thomas Horstemeyer, LLP

(57) ABSTRACT

Trigger based analytics database synchronization is described. In one example case, a trigger is invoked based on an operation issued for a record in a transactional database. According to the trigger, one or more data values for synchronization from the transactional database to an analytics database are determined. A message including the data values is formed and added to a message queue through a message infrastructure service including a message broker. In turn, the values from the message are stored in a suitable memory space, such as a staging table, for forwarding to an analytics computing system. Using the trigger and the message infrastructure service, execution of the transactional database operation can be detached in execution from the addition of the value to the staging table and synchronization with the analytics computing system.

20 Claims, 4 Drawing Sheets

(51) Int. Cl.
*G06F 16/23* (2019.01)
*G06F 16/242* (2019.01)
*G06F 16/27* (2019.01)

(58) Field of Classification Search
CPC .... G06F 16/2433; G06F 16/25; G06F 16/254; G06F 16/258; G06F 16/214; G06F 16/23; G06F 16/2386
See application file for complete search history.

(56) References Cited

U.S. PATENT DOCUMENTS

| | | |
|---|---|---|
| 10,067,838 B1 | 9/2018 | Keeriyadath et al. |
| 2004/0215656 A1* | 10/2004 | Dill ................ G06Q 30/02 |
| 2005/0071341 A1* | 3/2005 | Chkodrov ............ G06Q 10/10 |
| 2006/0004833 A1* | 1/2006 | Trivedi .................. G06F 9/466 |
| | | 707/999.102 |
| 2007/0027904 A1* | 2/2007 | Chow ................ G06F 16/283 |
| 2008/0074284 A1 | 3/2008 | Edwards et al. |
| 2009/0112939 A1 | 4/2009 | Sanghvi et al. |
| 2009/0271384 A1* | 10/2009 | Bakalash .......... C03B 37/02718 |
| 2010/0030777 A1 | 2/2010 | Panwar et al. |
| 2010/0082396 A1 | 4/2010 | Caldwell et al. |
| 2010/0153154 A1 | 6/2010 | Bergantino et al. |
| 2013/0073513 A1* | 3/2013 | Kemper .................. G06F 16/28 |
| | | 707/600 |
| 2014/0229423 A1* | 8/2014 | Bengali ............... G06F 11/1469 |
| | | 707/602 |
| 2014/0229628 A1* | 8/2014 | Mandal ............ G06F 16/24568 |
| | | 709/231 |
| 2014/0280913 A1 | 9/2014 | Karren et al. |
| 2015/0358391 A1 | 12/2015 | Moon et al. |
| 2016/0242024 A1 | 8/2016 | Karren et al. |
| 2016/0306827 A1 | 10/2016 | Dos et al. |
| 2016/0330219 A1 | 11/2016 | Hasan |
| 2017/0118211 A1 | 4/2017 | Murthy et al. |
| 2018/0150529 A1* | 5/2018 | McPherson .............. G06F 9/542 |
| 2018/0196878 A1* | 7/2018 | Iball ........................ G06F 16/22 |
| 2019/0050441 A1* | 2/2019 | Daniel .................... G06F 9/466 |

OTHER PUBLICATIONS

Arnold, Matthew, et al. "META: Middleware forevents, transactions, and analytics." IBM Journal of Research and Development 60.2-3 (2016): 15-1. (Year: 2016).*

A. Selmeci and T. Orosz, "SAP remote communications," 2012 7th IEEE International Symposium on Applied Computational Intelligence and Informatics (SACI), 2012, pp. 303-309, doi: 10.1109/SACI.2012.6250020. (Year: 2012).*

* cited by examiner

TRIGGER BASED ANALYTICS DATABASE SYNCHRONIZATION

RELATED APPLICATIONS

Benefit is claimed under 35 U.S.C. 119(a)-(d) to Foreign Application Serial No. 201741033570 filed in India entitled "TRIGGER BASED ANALYTICS DATABASE SYNCHRONIZATION", on Sep. 21, 2017, by VMware, Inc., which is herein incorporated in its entirety by reference for all purposes The present application is related in subject matter to U.S. patent application Ser. No. 15/865,264, which is incorporated herein by reference

BACKGROUND

Online transaction processing (OLTP) databases are designed for relatively large numbers of short transactions (e.g., insert, update, delete, and others) and queries. OLTP databases are typically relied upon by thousands of applications (or more) executed concurrently on devices. Thus, OLTP databases are designed for fast query processing, data integrity in multi-access environments, and high numbers of transactions per second. OLTP databases are also managed for availability, speed, and recoverability. The structure and organization of OLTP databases can be defined through relatively complex schema. In that context, "schema" refers to the manner or construct in which data is organized or, in the context of relational databases, divided into tables for databases. A schema can define the logical constraints imposed on the organization of and access to a database.

A relational database management system (RDBMS) is a database management system (DBMS) commonly used for OLTP databases. The structured query language (SQL) defines the standard syntax language for access to RDBMSs. In an RDBMS, data is stored in database objects, such as tables including records. Tables can be representatively considered as collections of related data entries and consisting of numerous rows and columns.

RDBMSs have been common for storing financial records, manufacturing and logistical information, personnel data, and other types of data for decades. To a great extent, relational databases have replaced hierarchical and network databases because they can be easier to understand and use. Although competing organizational structures and frameworks of databases have challenged the widespread use of relational databases, RDBMSs have grown market adoption over the years.

Online analytical processing (OLAP) databases are based on multidimensional organizational data models, allowing for complex analytical and ad hoc queries. The structure and organization of OLAP databases can be defined through relatively schema-less constructs. OLAP tools are directed to analyzing multidimensional data interactively from multiple perspectives. OLAP tools are useful for analyzing multi-dimensional analytical (MDA) queries swiftly through computing systems for business intelligence and other purposes. Example applications for OLAP include business reporting for sales, marketing, management, financing, and other purposes. OLAP databases can be contrasted with OLTP databases, as OLAP databases are generally described for use with more complex queries, in fewer numbers, to process transactions for business intelligence or reporting.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
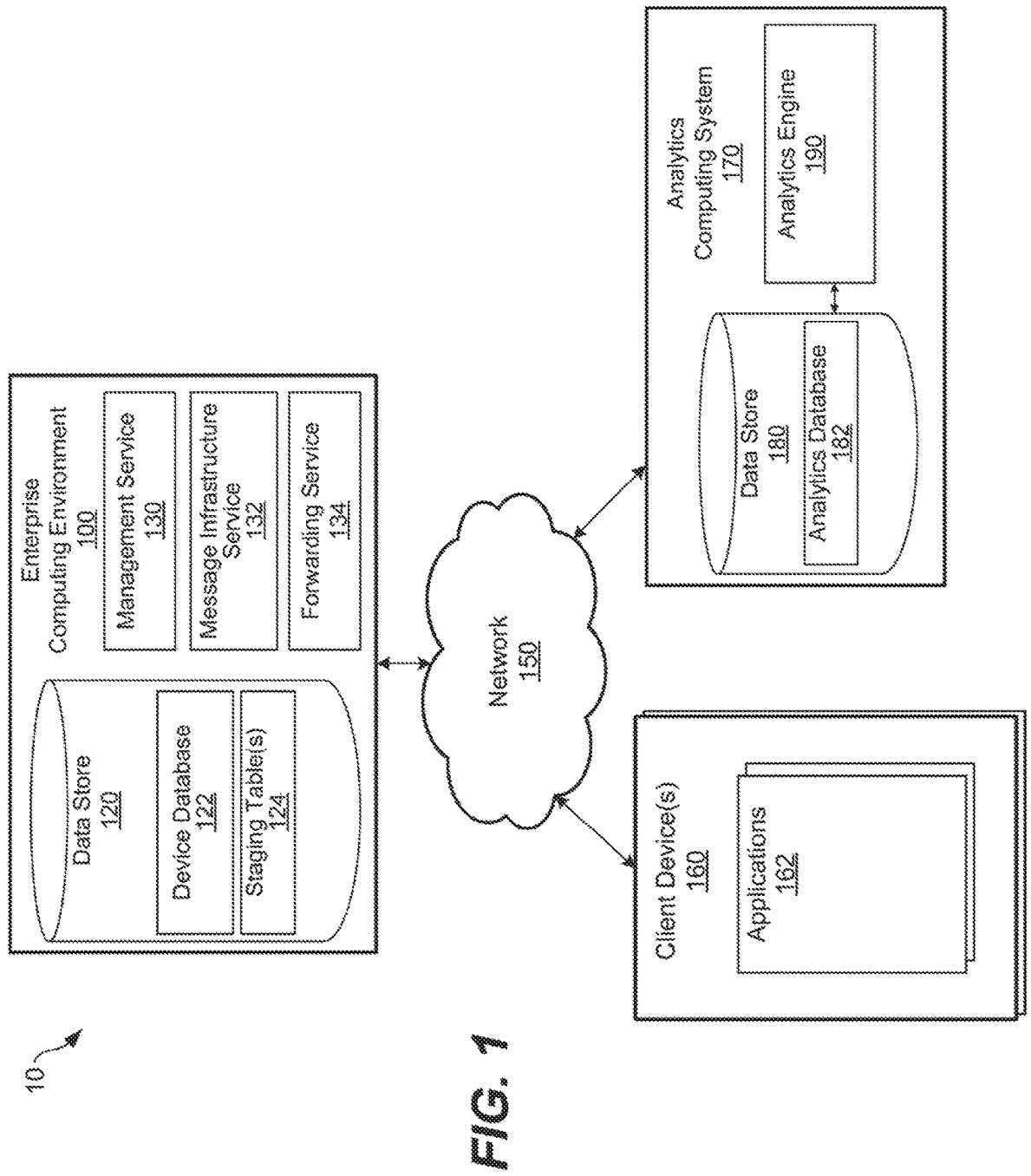
FIG. 1 illustrates an example networked environment for analytics database synchronization according to various examples described herein.

Enterprise-level mobile device management (MDM) platforms can be relied upon to facilitate the management of large numbers of devices, including desktop, laptop, and mobile devices. For example, the enrollment and association of users to mobile devices can be facilitated by MDM platforms. Similarly, the distribution, installation, and access to applications on a number of mobile devices can be managed by MDM platforms. Device management policies, compliance rules, and configurations can be enforced by MDM platforms through access, application, and feature/function controls on the devices.

Just as in other fields and industries, enterprise-level MDM platforms can rely upon RDMBS-based OLTP databases. Further, just as in other fields, there is a need to gather business intelligence and analytics from MDM platforms. Examples of such business intelligence and analytics include lists of applications present on all mobile devices for companies or business teams within companies, lists of memory requirements for such applications, lists of which applications comply with company profiles and/or requirements, and other information.

As outlined above, OLTP databases are designed for relatively large numbers of short transactions and queries. OLTP databases are designed for fast query processing, data integrity in multi-access environments, and high numbers of transactions per second. On the other hand, OLAP databases are based on multidimensional organizational data models, allowing for complex analytical and ad hoc queries. The structure and organization of OLAP databases can be defined through relatively schema-less constructs as compared with OLTP databases.

After an OLTP database is defined and populated with data, the need for business intelligence and analytics can lead to the need to mirror the data in an OLAP database. It can take a significant amount of time and processing overhead, however, to retrieve data from an OLTP database, normalize it, and store it to an OLAP database. Thus, it can be common for business intelligence to be generated based on data that is one or two days old.

In the context outlined above, aspects of trigger based database synchronization are described herein. For example, data stored in an OLTP (e.g., transactional) or similar database, which is defined according to a particular schema, can be ported and synchronized to a relatively schema-less OLAP analytics database for the purpose of conducting business intelligence and analytics processing. In one example case, a trigger is invoked based on an operation issued for a record in a transactional database. According to the trigger, one or more data values for synchronization from the transactional database to an analytics database are determined. A message including the data values is formed and added to a message queue through a message infrastructure service including a message broker. In turn, the values from the message are stored in a suitable memory space, such as a staging table, for forwarding to an analytics computing system. Using the trigger and the message infrastructure service, execution of the transactional database operation can be detached in execution from the addition of the value to the staging table and synchronization with the analytics computing system.

Turning to the drawings, the following paragraphs provide an outline of a networked environment followed by a discussion of the operation of the same. FIG. 1 illustrates an example networked environment 10 for analytics database synchronization according to various examples described herein. The networked environment 10 includes an enterprise computing environment 100, a network 150, a number of client devices 160, and an analytics computing system 170. Aspects of analytics database synchronization are described below with reference to the enterprise computing environment 100, the client devices 160, and the analytics computing system 170, but those components are representative and other networked environments and components can perform the concepts described herein.

The enterprise computing environment 100 can be embodied as one or more computers, computing devices, or computing systems. In certain embodiments, the enterprise computing environment 100 can include one or more computing devices arranged, for example, in one or more server or computer banks. The computing device or devices can be located at a single installation site or distributed among different geographical locations. The enterprise computing environment 100 can include a plurality of computing devices that together embody a hosted computing resource, a grid computing resource, or other distributed computing arrangement. In some cases, the enterprise computing environment 100 can be embodied as an elastic computing resource where an allotted capacity of processing, network, storage, or other computing-related resources varies over time. As further described below, the enterprise computing environment 100 can also be embodied, in part, as certain functional or logical (e.g., computer-readable instruction) elements or modules as described herein.

The enterprise computing environment 100 can function as a device management service for any number of devices, including the client devices 160. In that context, the enterprise computing environment 100 includes a data store 120, a management service 130, a message infrastructure service 132, and a forwarding service 134. The data store 120 includes areas in memory for storage of the device database 122 and the staging tables 124, among other types of data. In some cases, the staging tables 124 can be logically defined as a number of tables in the device database 122, but the staging tables 124 can also be stored separately from the device database 122 in the data store 120. Operational aspects of the enterprise computing environment 100 are described in further detail below.

The network 150 can include the Internet, intranets, extranets, wide area networks (WANs), local area networks (LANs), wired networks, wireless networks, cable networks, satellite networks, other suitable networks, or any combinations thereof. As one example, the enterprise computing environment 100, the client devices 160, and the analytics computing system 170 can be respectively coupled to one or more public or private LANs or WANs and, in turn, to the Internet for communication of data among each other. Although not shown in FIG. 1, the network 150 can also include communicative connections to any number and type of network hosts or devices, such as website servers, file servers, cloud computing resources, databases, data stores, or any other network or computing architectures.

In the networked environment 10, the enterprise computing environment 100, the client devices 160, and the analytics computing system 170 can communicate data among each other using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The client devices 160 are representative of one or more client devices. The client device 160 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client device 160 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client device 160.

As illustrated in FIG. 1, the client device 160 includes a number of applications 162. The applications 162 are representative of applications, application extensions, or other application-related components that can be executed on the client device 160. The applications 162 can include hypertext-based network browsers, such as the Internet Explorer®, Firefox®, Chrome®, Safari®, or Silk® browsers, among other types of browsers. Additionally, the applications 162 can be embodied as other types of applications, such as e-mail clients, messaging clients, document editors or viewers, file browsers, and other applications for other purposes.

The analytics computing system 170 can be embodied as one or more computers, computing devices, or computing systems similar to the enterprise computing environment 100. The analytics computing system 170 can be geographically separated from the enterprise computing environment 100 or, in some cases, reside at the same location as the enterprise computing environment 100. The analytics computing system 170 can gather and generate business-intelligence-related reports on the basis of data gathered by the enterprise computing environment 100, including data related to the status, performance, and use of the client devices 160. The analytics computing system 170 includes a data store 180 and an analytics engine 190. The data store 180 includes an area in memory for storage of the analytics database, among other types of data.

Turning back to aspects of the enterprise computing environment 100, the management service 130 can be configured to operate as a mobile device manager for one or more of the client devices 160. During a device management enrollment process, the management service 130 can remotely configure one or more of the client devices 160 for device management. Thus, the management service 130 can coordinate with the operating systems of the client devices 160 (and/or management agents executing on the client devices 160) to register and configure the client devices 160 for device management.

As part of the device management enrollment process (and even after enrollment has concluded), the management service 130 can install and uninstall certain software components on the client devices 160. The software components can include applications, resources, libraries, drivers, device configurations, and other related components. The management service 130 can also transfer device management data, including management policies, compliance rules, configuration data, and other policies and rules to the client devices 160. During and after this enrollment process, the management service 130 can gather various types of data related to the status, use, and management of the client devices 160. The data can be associated with hardware, software, user, network, and other aspects of the status, use, and management of the client devices 160. The data can be stored by the management service 130 in the device database 122 for reference and processing in connection with device management.

The device database 122 can be embodied as a transactional database to store a number of tables having a number of records defined according to a schema for the purpose of MDM. Thus, as a reference database for device management, the device database 122 can be created, administered, updated, and referenced over time by the management service 130. Access to the device database 122 can be driven by changes or actions which occur on the client devices 160 with relatively high frequency and volume over time. In that context, the device database 122 can be designed as a type of relational or OLTP database for relatively large numbers of simple transactions and queries.

The device database 122 can be organized into tables having records of rows, columns, and attributes, for example, according to a schema. Any number of data values can be stored in the tables. As noted above, the device database 122 can be used by the management service 130 to store data related to the status, use, and management of the client devices 160. Among other types of data, the records in the device database 122 can include hardware- and software-related device identifiers, version numbers, serial numbers, and related data of the client devices 160. The data can also include lists of applications, rules, policies, and files installed on the client devices 160, lists of users associated with the client devices 160, application- and device-level resource usage data associated with the client devices 160, and access data associated with the client devices 160, among other data. Thus, over time, the device database 122 can be populated with a significant amount of useful data representative of various operating characteristics and settings of the client devices 160. In operation, the data values stored in the device database 122 are constantly changing over time.

However, the access demands placed on the device database 122 by the management service 130 (and the constraints imposed due to the relational database schema structure of the device database 122) limit the ability to process the data in the device database 122 for the purpose of business intelligence and analytics. Thus, as described herein, a copy of the data stored in the device database 122 can be mirrored in the analytics database 182 of the analytics computing system 170 for business intelligence and analytics purposes.

As the data stored in the device database 122 is updated or changed over time, those updates can be copied or propagated to the analytics database 182 by the message infrastructure service 132 through the creation of messages triggered by the updates. The messages can include data values representative of any updates or changes to the data values in the records of the device database 122, as those updates or changes occur over time. In that context, the message infrastructure service 132 is configured to process a number of messages for the transfer of data values from the device database 122 to the analytics database 182. As part of the transfer process, the message infrastructure service 132 can store the messages in queues, normalize the data values, and ultimately store the data values in the staging tables 124. In turn, the forwarding service 134 is configured to retrieve the data values stored in the staging tables 124 and forward them to the analytics computing system 170.

In some cases, the message infrastructure service 132 can operate in an ongoing fashion to maintain the synchronization of data values from the device database 122 to the analytics database 182. The updates or changes to the data values in the device database 122 can include changes in previously-reviewed records, the deletion of previously-reviewed records, the addition of new records, and other events in the device database 122. The operations of the message infrastructure service 132 and the forwarding service 134 are described in further detail below with reference to FIGS. 2 and 3A-3C.

The analytics engine 190 of the analytics computing system 170 is configured to receive the data values from the forwarding service 134, format the data values, and store the data values in the analytics database 182. As compared to the device database 122, the organizational structure of the analytics database 182 can be defined by a relatively schema-less construct (e.g., a type of OLAP database). In some cases, the analytics database 182 can include a number of separate analytics databases, each used for a different purpose, and the analytics engine 190 can store the data received from the forwarding service 134 in each of those databases. The analytics engine 190 is further configured to submit multi-dimensional analytical queries to the analytics database 182 for business intelligence reporting and other purposes. As examples, the analytics engine 190 can gather data from the analytics database 182 and use it to generate reports for sales, marketing, device management, information technology security, and other purposes.

Once an initial import of the data from the device database 122 to the analytics database 182 is complete, the message infrastructure service 132 can continue to broker messages including updated data values for forwarding to the analytics computing system 170. The updates or changes to the data values in the device database 122 can include changes in previously-reviewed records, the deletion of previously-reviewed records, the addition of new records, and other events in the device database 122. The operations of the message infrastructure service 132 and the forwarding service 134 are described in further detail below with reference to FIGS. 2 and 3A-3C.

Figure 2:
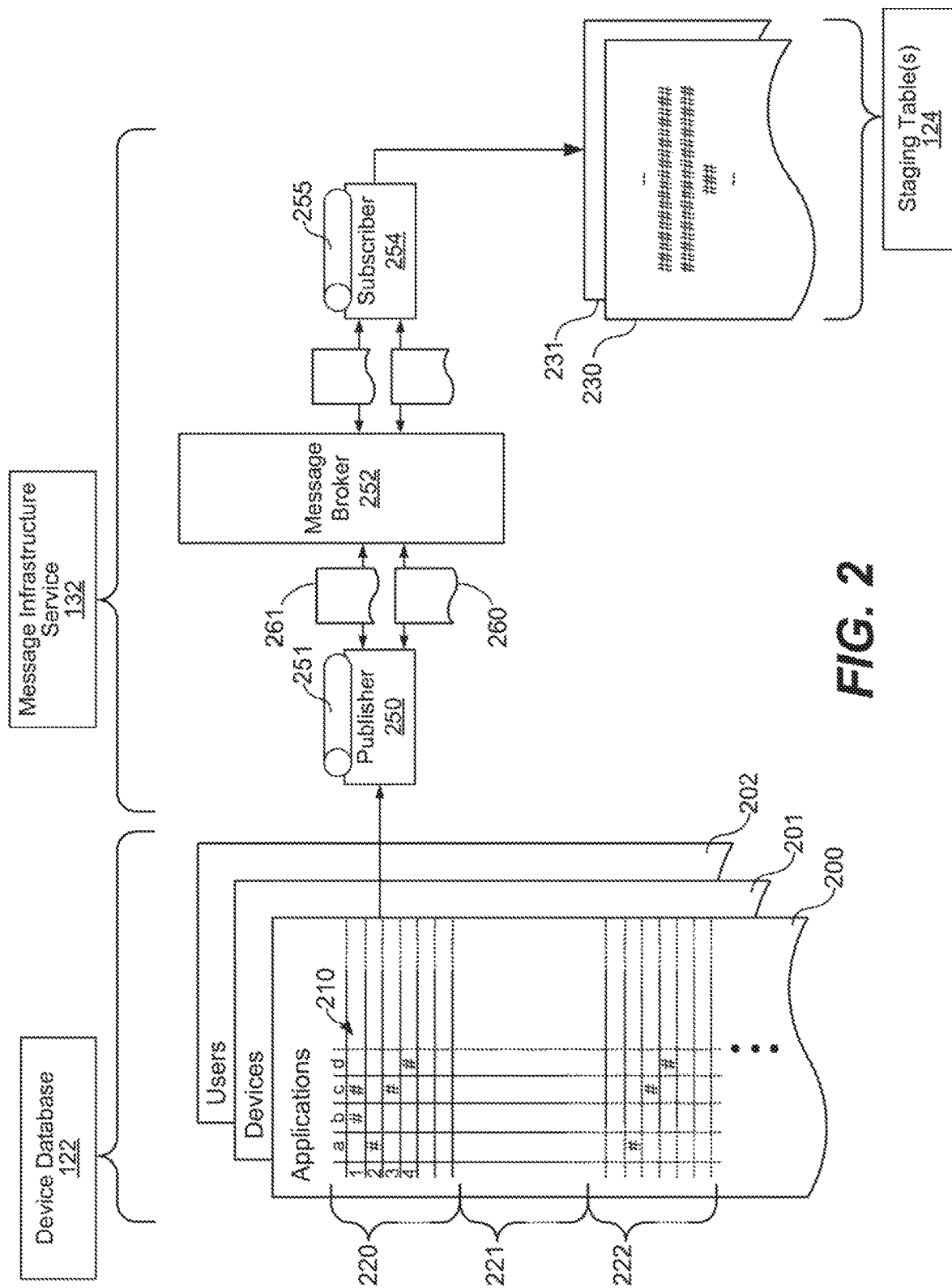
FIG. 2 illustrates a representative example of how a device database can be synchronized with an analytics database in the networked environment shown in FIG. 1, according to various examples described herein.

FIG. 2 illustrates a representative example of how data values in the device database 122 can be synchronized with the analytics database 182 by the message infrastructure service 132 and the forwarding service 134. FIG. 2 is presented to provide context for a more detailed description of the operations of the message infrastructure service 132 and the forwarding service 134, as provided with reference to FIGS. 3A-3C.

In FIG. 2, a number of tables 200-202 of the device database 122 are shown. As an example, table 200 is related to a listing of applications present or installed on the client devices 160, table 201 is related to a listing of the client devices 160 and certain operating characteristics of the client devices 160, and table 202 is related to a listing of the users associated with the client devices 160. Further, various records and fields can be logically joined or linked together among the tables 200-202 based on the schema for the device database 122. The device database 122 can, of course, store other types of data rather than and/or in addition to that illustrated in FIG. 2. Additionally, although a logical arrangement of tables and records is illustrated as an example in FIG. 2, the device database 122 can include any number of tables and records organized in any suitable manner depending upon the needs of the management service 130.

One or more of the tables 200-202 can include a number of records each including a number of fields associated with various types of data. As an example, the record 210 in the table 200 can be associated with a list of applications installed on one of the client devices 160. The record 210 is shown as row "1," having columns or fields "a," "b," "c," "d," and so on. Data values can be stored in connection with the fields of the records of the tables 200-202. The arrangement of the fields in the records in FIG. 2 is provided as an example, and other suitable arrangements can be used. The data values in the records of the tables 200-202 can be updated or changed over time by the management service 130 or other service executed in the enterprise computing environment 100.

The device database 122 can be configured to invoke triggers in response to certain conditions or events. In that context, a trigger can be embodied as a procedure invoked in the device database 122 when a certain operation occurs with respect to the device database 122. For example, a trigger can be invoked when one or more data values in the device database 122 are modified through a data manipulation language (DML) event or operation directed by the management service 130, for example, DML events or operations can include insert, update, and delete statements, among others. As other examples, data definition language (DDL) triggers can be invoked in response to certain SQL, alter, and drop statement operations, among others.

As part of the procedure executed according to a trigger, the trigger can determine one or more data values to synchronize from the device database 122 to the analytics database 182 in the analytics computing system 170. In that context, a trigger can identify the addition of new data values, changes to data values, and deletions of data values in the device database 122, including changes that should be propagated or migrated to the analytics database 182. Once determined, the trigger can provide the new or changed data values to the message infrastructure service 132 for further processing. In some cases, rather than (or in addition to) forwarding data values to the message infrastructure service 132, the trigger can forward some instructions to the message infrastructure service 132, such as instructions to delete data from the analytics database 182.

As shown in FIG. 2, the message infrastructure service 132 includes a publisher 250, a message broker 252, and a subscriber 254. The message infrastructure service 132 also includes a publisher queue 251 and a subscriber queue 255. The publisher 250, message broker 252, and subscriber 254 can communicate with each other, in part, using messages 260 and infrastructure messages 261. The messages 260 can be formed in any suitable format or syntax suitable to convey data values or instructions, for example, being synchronized from the device database 122 to the analytics computing system 170. Each message 260 can also include a unique identifier for tracking, identification, and accounting purposes.

The infrastructure messages 261 can be used to convey instructions and certain status information between the publisher 250, message broker 252, and subscriber 254. The publisher 250, message broker 252, and subscriber 254 can all form infrastructure messages 261 in certain cases. For example, the infrastructure messages 261 can be formed and used by the subscriber 254 to confirm the storage of data values to the staging tables 124. The infrastructure messages 261 can also be formed by the message broker 252 to convey an error, such as the failure of the subscriber 254 to stage data values. Other examples of the messages 260 and the infrastructure messages 261 are provided below.

The message infrastructure service 132 is configured to receive data values or instructions from the device database 122 in response to the execution of the triggers as described above. The publisher 250 can, in turn, form one or more messages 260 including the data values or instructions received from the device database 122 and provide the messages 260 to the message broker 252. The messages 260 can be formed in any suitable format or syntax suitable to convey data values or instructions.

The message broker 252 is configured to broker the messages 260 between the publisher 250 and the subscriber queue 255. As examples, the message broker 252 can pass or forward messages 260 including data values between the publisher 250 and the subscriber queue 255. The message broker 252 can also track the status of the messages 260 passed between the publisher 250 and the subscriber queue 255, such as the status of the synchronization of data values to the analytics computing system 170. In some cases, the message broker 252 can also generate one or more infrastructure messages 261 to convey an error, such as the failure of the subscriber 254 to stage data values for synchronization to the analytics computing system 170. The message broker 252 can provide the infrastructure messages 261 to the publisher 250, and the publisher 250 can store the infrastructure messages 261 to the publisher queue 251.

The subscriber 254 is configured to receive messages 260 from the message broker 252. When the subscriber 254 receives a message 260 from the message broker 252, the subscriber 254 can first store the message 260 in the subscriber queue 255 for further processing. In some cases, such as if the subscriber queue 255 is full, the subscriber 254 can reject the receipt of one or more messages 260 from the message broker 252. In that case, the message broker 252 can generate an infrastructure message 261 that indicates or conveys an error and provide it to the message broker 252. Once stored in the subscriber queue 255, the subscriber 254 can evaluate the messages 260, retrieve or remove any data values or instructions from the messages 260, and store the data values to the staging tables 124. From the staging tables 124, the forwarding service 134 can forward the data values to the analytics computing system 170 as described below.

As outlined above, the object of the message infrastructure service 132 is to propagate changes made to the device database 122 to the analytics database 182, and the message infrastructure service 132 uses the messages 260 and infrastructure messages 261 to do so. The message infrastructure service 132 helps to reduce the per-transaction processing burden placed on the device database 122 when propagating the changes. If the processes performed by the triggers, for example, were relied upon to synchronize data values to the analytics database 182, each operation (e.g., insert, update, delete, and other operations) performed at the device database 122 might take a significantly longer amount of time. Thus, through use of the message infrastructure service 132, the execution of the operations of the device database 122 are detached from the execution of the processes for synchronizing the changes to the analytics database 182.

In some cases, the message infrastructure service 132 can populate the analytics database 182 with the data values from the device database 122 in two main phases, including a first import phase and a second synchronization phase. The import phase can be relied upon to populate the analytics database 182 with the data values stored in the device database 122, in bulk, for the first time. After the import phase is complete, the synchronization phase can be relied upon to keep the analytics database 182 updated, over time, as data values are added to or changed in the device database 122.

In the import phase, the message infrastructure service 132 is configured to retrieve all the data values from the device database 122. In one example case, the data values can be retrieved from the device database 122 in batches of records. Batches are groups of records, and example batches 220-222 are shown in FIG. 2. To limit access to (and the burden on) the device database 122, the message infrastructure service 132 can be configured to work with batches of 5, 10, 20, or other suitable numbers of records at a time. Thus, the message infrastructure service 132 can retrieve all the data values from the device database 122 in the batch 220, for example, before turning to retrieve the data values in the batch 221, and so on.

The message infrastructure service 132 is also configured to normalize or flatten the data values received from the device database 122 before they are stored in the staging tables 124. The message infrastructure service 132 can normalize or flatten the data values by discarding any associated or underlying attributes, such as data type, database schema, inter-record or inter-table reference, or other attributes, from the data values. For certain attributes, rather than being discarded, the attributes are normalized or encoded into another standard data format in connection with the data values. The message infrastructure service 132 can flatten the data values into extensible markup language (XML) strings, for example, or other suitable data formats before the data values are stored in the staging tables 124.

Once stored in the staging tables 124, the data values are ready to be forwarded to the analytics computing system 170 by the forwarding service 134. Thus, as data values from the device database 122 are stored in the staging tables 124, the forwarding service 134 is configured to retrieve the data values from the staging tables 124 and forward (e.g., transfer over the network 150) those data values to the analytics computing system 170 for incorporation into the analytics database 182. Once the data values are received by the analytics computing system 170, the data values can be organized into any suitable format by the analytics engine 190, before being stored into the analytics database 182.

In one example case, the message infrastructure service 132 first stores any data values from the device database 122 into an event staging table 230. The data values can be appended to the end of the event staging table 230. In turn, the forwarding service 134 reviews the data values stored in the event staging table 230 and copies or moves those data values, in groups, to a jobs staging table 231. The forwarding service 134 can then retrieve the data values from the jobs staging table 231 and conduct an application programming interface (API) call to the analytics computing system 170 to transfer the data values using a suitable network protocol over the network 150. Even after the import phase is complete, the forwarding service 134 can continue to check the event staging table 230 to identify whether any new or updated data values have been stored in the staging tables 124 by the message infrastructure service 132, as will be discussed in further detail below.

Figure 3A:
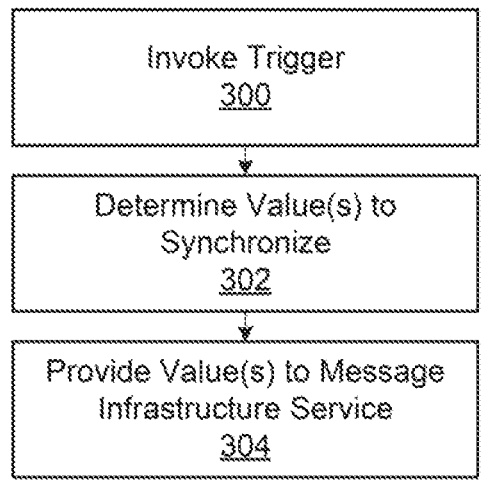
FIG. 3A illustrates an example trigger based process for database synchronization according to various examples described herein.
Figure 3B:
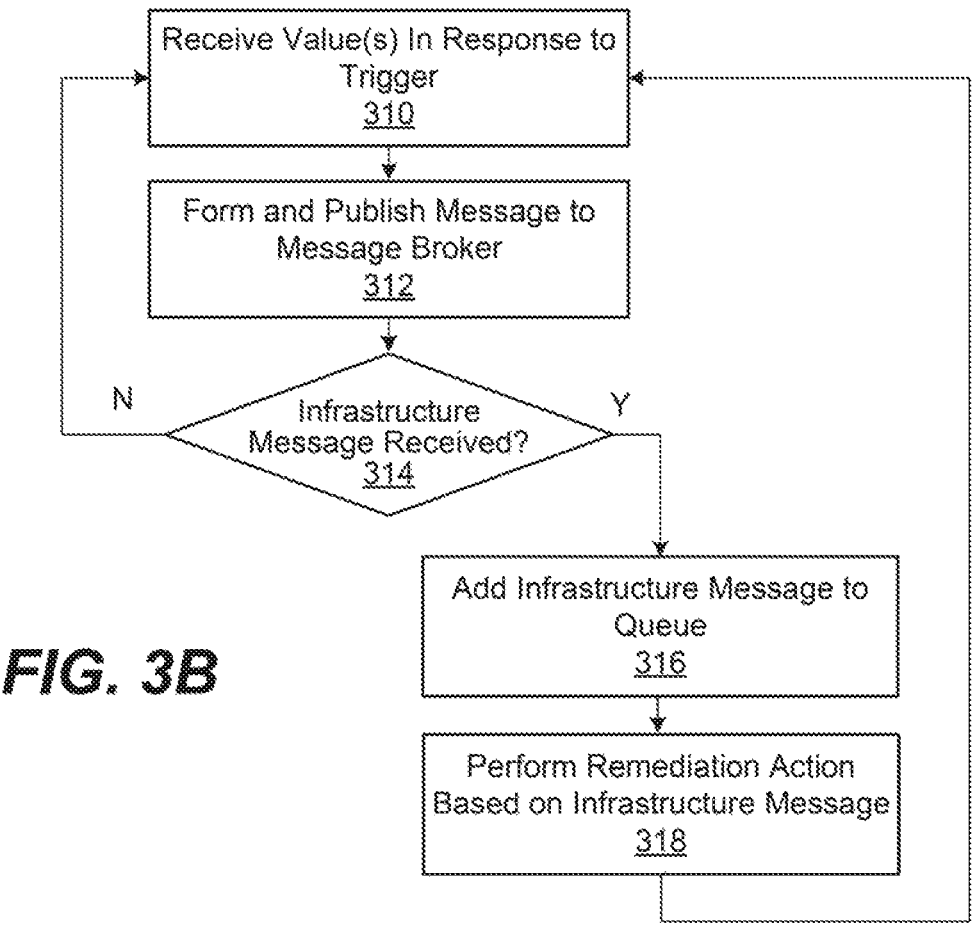
FIG. 3B further illustrates the example trigger based process for database synchronization according to various examples described herein.
Figure 3C:
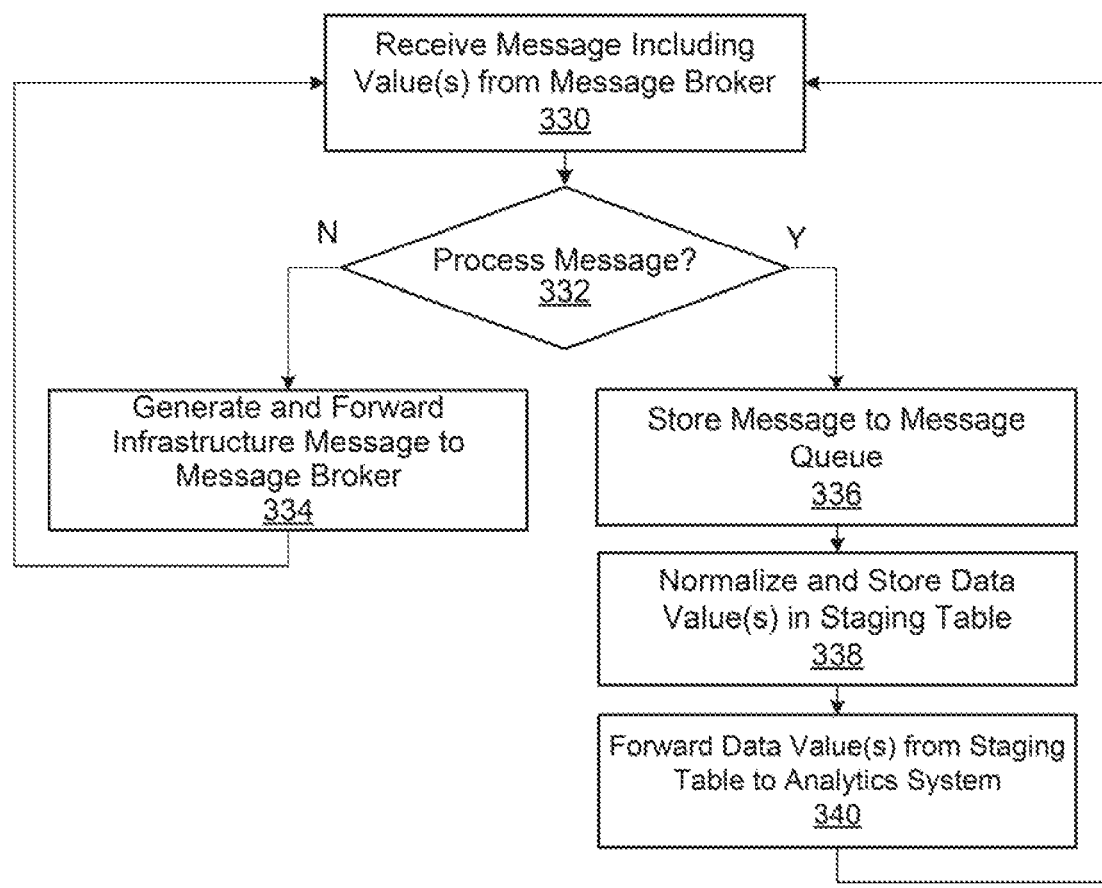
FIG. 3C further illustrates the example trigger based process for database synchronization according to various examples described herein.

Turning to a more detailed description of the operations of the device database 122, the message infrastructure service 132, and the forwarding service 134, FIGS. 3A-3C illustrate an example trigger based process for database synchronization. The processes shown in FIGS. 3A-3C can be performed by the components in the enterprise computing environment 100 shown in FIG. 1, although other computing systems can be relied upon. Although FIGS. 3A-3C show an order of execution, the order of execution can differ from that which is shown. For example, the order of execution of two or more elements or steps can be switched relative to the order shown or as described below. Two or more elements shown in succession can be executed concurrently or with partial concurrence, and one or more of the elements shown in the flowcharts can be skipped or omitted.

At the outset of the process shown in FIG. 3A, it is assumed that the device database 122 has been populated by the management service 130 with data representative of various operating characteristics and settings of the client devices 160. At step 300, the process can include the database 122 invoking a trigger based on an operation issued for a record in the database 122. The trigger can be embodied as a procedure invoked in the device database 122 when a certain operation or query language statement occurs with respect to the device database 122. For example, a trigger can be invoked at step 300 when one or more data values in the device database 122 are modified through a DML event or operation directed by the management service 130, for example. DML events or operations can include insert, update, and delete statements, among others. As other examples, DDL triggers can be invoked in response to certain SQL, alter, and drop statement operations, among others.

At step 302, the process includes the trigger determining one or more data values to synchronize from the device database 122 to the analytics database 182. The data values can be determined based on the insert, update, and delete statements that invoked the trigger, for example. Those statements can include identifiers of the particular records and fields in which data values are being inserted, updated, and deleted. An example update statement can change the data of one or more rows in one or more records in the device database 122, possibly based on a number of conditions. The query language statements can also include the data values being inserted and updated. Thus, the trigger can reference those query language statements to determine what data values need to be synchronized with the to the analytics database 182.

At step 304, the process includes the trigger providing the data values determined at step 302 to the message infrastructure service 132 for further processing. The trigger can also identify which records and fields the data values are associated with according to the schema of the device database 122. In some cases, rather than (or in addition to)

forwarding data values to the message infrastructure service 132, the trigger can provide some instructions to the message infrastructure service 132, such as instructions to delete certain data values.

Turning to FIG. 3B, at step 310, the process includes the publisher 250 of the message infrastructure service 132 receiving one or more data values provided by the trigger at step 304. The publisher 250 can also receive identifiers of the particular records and fields in which the data values were inserted, updated, or deleted from the device database 122.

At step 312, the process includes the publisher 250 forming a message, such as the message 260 described above with reference to FIG. 2, including the data values received at step 310. The message 260 can also include one or more identifiers of which records and fields the data values are associated with according to the schema of the device database 122. The message 260 can be formed by the publisher 250 in any suitable format or syntax suitable to convey the data values or instructions, for example, being synchronized from the device database 122 to the analytics computing system 170. At step 312, the process can also include the publisher 250 publishing the message 260 to the message broker 252.

At step 314, the process can include the publisher 250 determining whether an infrastructure message 261 was received from the message broker 252. If an infrastructure message 261 was received, then the process proceeds to step 316. Otherwise, if no infrastructure message 261 was received, then the process proceeds back to step 310 to receive any other data values from triggers executed by the device database 122. As discussed above, infrastructure messages 261 can be used to convey instructions and certain status information between the publisher 250, message broker 252, and subscriber 254.

At step 316, the process includes the publisher 250 adding the infrastructure message 261 to the publisher queue 251. The publisher 250 can rely upon the publisher queue 251 to store and organize infrastructure messages 261 received from the message broker 252 for later evaluation and processing. As examples, the infrastructure messages 261 can confirm that data values were stored to the staging tables 124 by the subscriber 254. The infrastructure messages 261 can identify an error, such as the failure of the subscriber 254 to stage data values.

At step 318, the process can include the publisher 250 performing one or more remediation actions based on the content of the infrastructure message 261 in the publisher queue 251. Depending upon the content of the infrastructure message 261, the process can include the publisher 250 republishing one or more messages 260 including certain data values to the message broker 252. The process can also include the publisher 250 confirming that one or more data values have been staged in the staging tables 124 for forwarding to the analytics computing system 170 by the forwarding service 134. After step 318, the process can proceed back to step 310 to receive additional data values for synchronization.

Turning to FIG. 3C, at step 330, the process includes the subscriber 254 receiving a message 260 from the message broker 252. At step 332, the process includes the subscriber 254 determining whether to process the message 260 from the message broker 252. The subscriber 254 may not accept or process the message 260, for example, if the subscriber queue 255 is full or for other reasons it cannot be processed. If the message 260 is not processed, then the process proceeds to step 334. Otherwise, if the message 260 can be processed, then the process proceeds to step 336.

At step 334, the process includes the subscriber 254 generating and forwarding an infrastructure message 261 to the message broker 252. The infrastructure message 261 can indicate that the message 260 received at step 330 was not (or could not be) processed. The infrastructure message 261 can also include information sufficient to identify the message 260 received at step 330, such as the data values in the message 260, a message identifier associated with the message 260, or other relevant information. In turn, the message broker 252 can forward the infrastructure message 261 back to the publisher 250 to take remediation actions as described herein. From step 334, the process can proceed back to step 330.

At step 336, the process includes the subscriber 254 storing the message 260 received at step 330 to the subscriber queue 255. The subscriber 254 can rely upon the subscriber queue 255 to store and organize messages 26 received from the message broker 252 for later evaluation and processing.

At step 338, the process can include the subscriber 254 normalizing the data values in the message 260 stored in the subscriber queue 255. The subscriber 254 can normalize or flatten the data values by discarding any associated or underlying attributes, such as data type, database schema, inter-record or inter-table reference, or other attributes, from the data values. For certain attributes, rather than being discarded, the attributes can be normalized or encoded into another standard data format to be stored with the data values. The subscriber 254 can flatten the data values into extensible markup language (XML) strings, for example, or other suitable data formats.

After the data values are normalized, step 338 can also include the subscriber 254 storing the data values to the staging table 124. As discussed above with reference to FIG. 2, the subscriber 254 can first append the data values to the end of the event staging table 230, for example, before the forwarding service 134 reviews the data values stored in the event staging table 230 and copies or moves those data values, in groups, to the jobs staging table 231.

At step 340, the process includes the forwarding service 134 forwarding data values from the staging table 124 to the analytics computing system 170 for storage in the analytics database 182. For example, the forwarding service 134 can periodically check the event staging table 230 to identify whether any data values have been stored there by the message infrastructure service 132. When the forwarding service 134 identifies data values in the event staging table 230 to be forwarded to the analytics computing system 170, the forwarding service 134 can move or copy those data values, in groups, to the jobs staging table 231. The forwarding service 134 can then retrieve the data values from the jobs staging table 231 and conduct an API call to transfer the data values to the analytics computing system 170, possibly in groups, using a suitable network protocol over the network 150. When the data values are received at the analytics computing system 170, the analytics engine 190 can store the data values in the analytics database 182, which can include a number of separate or different analytics databases, each used for a different purpose.

The flowcharts shown in FIGS. 3A-3C show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The enterprise computing environment 100 can include at least one processing circuit. Such a processing circuit can include, for example, one or more processors and one or more storage or memory that are coupled to a local interface. The local interface can include, for example, a data bus with an accompanying address/control bus or any other suitable bus structure. Similarly, the client devices 160 can include at least one processing circuit. Such a processing circuit can include, for example, one or more processors and one or more storage or memory devices that are coupled to a local interface.

The storage or memory devices can store data or components that are executable by the processors of the processing circuit. For example, the management service 130, the message infrastructure service 132, the forwarding service 134, and/or other components can be stored in one or more storage devices and be executable by one or more processors in the enterprise computing environment 100.

The management service 130, message infrastructure service 132, forwarding service 134, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 130, message infrastructure service 132, forwarding service 134, and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

What is claimed is:

1. A method for synchronization of data between databases, the method comprising:

invoking a trigger based on an operation issued for a record in a transactional database of a computing environment;

according to the trigger, determining at least one data value to synchronize from the record in the transactional database of the computing environment to an analytics database of an analytics computing system;

forming, by a publisher of a message service executing in the computing environment, a message comprising the at least one data value;

adding the message to a message queue of the message service, the message queue comprising a plurality of messages formed by the message service to detach operations in the transactional database of the computing environment from data synchronization with the analytics database of the analytics computing system;

normalizing, by a subscriber of the message service, the at least one data value stored in the message queue into at least one normalized data value in a first at least one extensible markup language (XML) string, wherein the at least one data value comprises a plurality of underlying attributes, and the normalizing comprises discarding a first attribute of the at least one data value and encoding a second attribute of the at least one data value as a second at least one XML string;

storing, by the subscriber, the first at least one XML string and the second at least one XML string to a staging table in the computing environment for data synchronization with the analytics database; and forwarding, by a forwarding service executing in the computing environment, the at least one normalized data value from the staging table in the computing environment to the analytics database of the analytics computing system over a computer network using a network transfer protocol, wherein the forwarding service initiates an Application Programming Interface (API) call to the analytics computing system to synchronize the at least one data value between the transactional database and the analytics database using the network transfer protocol.

2. The method according to claim 1, wherein the operation comprises at least one of an insert, update, or delete operation for the record in the transactional database.

3. The method according to claim 1, wherein, through use of the message, execution of the operation issued for the record in the transactional database is detached from execution of storing the at least one data value to the staging table.

4. The method according to claim 1, wherein adding the message to the message queue comprises:
- publishing, by the publisher executing in the computing environment, the message to a message broker executing in the computing environment; and
- adding, by the message broker, the message to the message queue stored in the computing environment, wherein the at least one data value in the message in the message queue is queued in a format of the transactional database, and the subscriber normalizes the at least one data value from the format of the transactional database into the at least one normalized data value.

5. The method according to claim 4, further comprising, after publishing the message to the message broker, receiving, by the publisher, an infrastructure message from the message broker.

6. The method according to claim 5, wherein the infrastructure message includes at least one of a confirmation message or an error message associated with the message.

7. The method according to claim 6, wherein the error message indicates that the message queue was full or that the message was lost.

8. The method according to claim 1, wherein the forwarding further comprises forwarding the at least one normalized data value from the staging table to the analytics computing system for incorporation into the analytics database.

9. The method according to claim 8, wherein the plurality of underlying attributes comprise at least one of: a data type of the at least one data value, a database schema of the at least one data value, an inter-record reference of the at least one data value, and an inter-table reference of the at least one data value.

10. A non-transitory computer-readable medium embodying computer-readable program instructions executable in at least one computing device for synchronization of data between databases that, when executed by the at least one computing device, direct the at least one computing device to at least:
- invoke a trigger based on an operation issued for a record in a transactional database;
- according to the trigger, determine at least one data value to synchronize from the record in the transactional database to an analytics database of an analytics computing system;
- form, by a publisher of a message service executing in the at least one computing device, a message comprising the at least one data value;
- add the message to a message queue of the message service, the message queue comprising a plurality of messages formed by the message service to detach operations in the transactional database from data synchronization with the analytics database;
- normalize, by a subscriber of the message service, the at least one data value stored in the message queue into at least one normalized data value in a first at least one extensible markup language (XML) string, wherein the at least one data value comprises a plurality of underlying attributes, and the normalizing comprises discarding a first attribute of the at least one data value and encoding a second attribute of the at least one data value as a second at least one XML string;
- store, by the subscriber, the first at least one XML string and the second at least one XML string to a staging table in the computing environment for data synchronization with the analytics database; and
- forward, by a forwarding service executing in the at least one computing device, the at least one normalized data value from the staging table to the analytics database of the analytics computing system over a computer network using a network transfer protocol, wherein the forwarding service initiates a network call to the analytics computing system to synchronize the at least one data value between the transactional database and the analytics database.

11. The non-transitory computer-readable medium according to claim 10, wherein the operation comprises at least one of an insert, update, or delete operation for the record in the transactional database.

12. The non-transitory computer-readable medium according to claim 10, wherein, through use of the message, execution of the operation issued for the record in the transactional database is detached from storage of the at least one data value to the staging table.

13. The non-transitory computer-readable medium according to claim 10, wherein the at least one computing device is further directed to at least:
- publish, by the publisher, the message to a message broker; and
- add, by the message broker, the message to the message queue.

14. The non-transitory computer-readable medium according to claim 13, wherein the at least one computing device is further directed to receive, by the publisher, an infrastructure message from the message broker.

15. The non-transitory computer-readable medium according to claim 14, wherein the infrastructure message includes at least one of a confirmation message or an error message associated with the message.

16. A system for synchronization of data between databases, comprising:
- a memory device configured to store computer-readable instructions thereon; and
- at least one computing device configured, through execution of the computer-readable instructions, to at least:
  - invoke a trigger based on an operation issued for a record in a transactional database;
  - according to the trigger, determine at least one data value to synchronize from the record in the transactional database to an analytics database of an analytics computing system;
  - form, by a publisher of a message service executing in the at least one computing device, a message comprising the at least one data value;
  - add the message to a message queue of the message service, the message queue comprising a plurality of messages formed by the message service to detach operations in the transactional database from data synchronization with the analytics database;
  - normalize, by a subscriber of the message service, the at least one data value stored in the message queue into at least one normalized data value in a first at least one extensible markup language (XML) string, wherein the at least one data value comprises a plurality of underlying attributes, and the normalizing comprises discarding a first attribute of the at least one data value and encoding a second attribute of the at least one data value as a second at least one XML string;
  - store, by the subscriber, the first at least one XML string and the second at least one XML string to a staging table in the computing environment for data synchronization with the analytics database; and
  - forward, by a forwarding service executing in the at least one computing device, the at least one normalized data value from the staging table to the analytics database of the analytics computing system over a computer network using a network transfer protocol, wherein the forwarding service initiates a network call to the analytics computing system to synchronize the at least one data value between the transactional database and the analytics database.

17. The system according to claim 16, wherein the operation comprises at least one of an insert, update, or delete operation for the record in the transactional database.

18. The system according to claim 16, wherein, through use of the message, execution of the operation issued for the record in the transactional database is detached from storage of the at least one data value to the staging table.

19. The system according to claim 16, wherein the at least one computing device is further configured to at least:
   publish, by the publisher, the message to a message broker; and
   add, by the message broker, the message to the message queue.

20. The system according to claim 19, wherein the at least one computing device is further configured to receive, by the publisher, an infrastructure message from the message broker, wherein the infrastructure message includes at least one of a confirmation message or an error message associated with the message.

* * * * *